United States Patent [19]

Srock

[11] 4,214,788
[45] Jul. 29, 1980

[54] LINING PART FOR THE PASSENGER COMPARTMENT OF AN AUTOMOBILE

[75] Inventor: Rainer Srock, Leonberg, Fed. Rep. of Germany

[73] Assignee: Dr. Ing. h.c.F. Porsche Aktiengesellschaft, Del.X

[21] Appl. No.: 931,968

[22] Filed: Aug. 8, 1978

Related U.S. Application Data

[63] Continuation-in-part of Ser. No. 923,229, Jul. 10, 1978.

[51] Int. Cl.² ............................................. B62D 25/00
[52] U.S. Cl. .................................................. 296/39 R
[58] Field of Search .................... 296/39 A, 39 R, 146, 296/153

[56] References Cited

U.S. PATENT DOCUMENTS

| | | | |
|---|---|---|---|
| 2,405,423 | 8/1946 | Hayes | 296/39 A |
| 2,601,677 | 6/1952 | Wettlaufer | 296/153 |
| 3,279,853 | 10/1966 | Cromwell | 296/153 |
| 3,387,881 | 6/1968 | Stepanek | 296/153 |
| 3,791,693 | 2/1974 | Hellriegel | 296/146 |
| 3,829,150 | 8/1974 | Moore | 296/39 A |
| 4,116,485 | 9/1978 | Svensson | 296/39 R |

FOREIGN PATENT DOCUMENTS

2509368  4/1975  Fed. Rep. of Germany ........ 296/39 R

*Primary Examiner*—John J. Love
*Assistant Examiner*—Norman L. Stack
*Attorney, Agent, or Firm*—Craig & Antonelli

[57] ABSTRACT

A lining part for the passenger compartment of an automobile comprises a rigid support, a padding, and a thin flexible covering element which is constructed by the padding being created by a foamed layer that has been caused to react between the support and the covering element so as to be joined thereto and present a non-uniform cross sectional development which is adapted to various functions. In a preferred embodiment, tolerance-compensating studs are provided for securing the lining part to a vehicle body member. These studs are applied to the support independently of the foamed layer and are retained within openings of the support that are disposed in depressions that are spaced from the foamed layer for enabling the studs to be laterally shifted within the openings.

8 Claims, 3 Drawing Figures

LINING PART FOR THE PASSENGER
COMPARTMENT OF AN AUTOMOBILE

This application is a continuation-in-part of U.S. patent application Ser. No. 923,229, filed July 10, 1978.

BACKGROUND AND SUMMARY OF THE INVENTION

The invention relates to a lining part for the passenger compartment of an automobile, which comprises a support that does not change its configuration due to its inherent rigidity, a padding, and a covering element that covers the padding, made e.g. of yielding plastic foil.

A lining part of the mentioned kind is known (German OS No. 2,424,001) which is constituted by a support that does not change its configuration, and a padding. The padding is covered by a covering element. There is the drawback in this arrangement that both the support and the padding are prefabricated plates, for which reason the lining part can be produced with only a substantially uniform cross section, and it is not suitable for countersunk acceptance of lights, sun visors, etc., or for provision of localized enlargements.

The invention is intended to provide a lining part whereby the described deficiencies will be avoided. Here however, all members for retention of the lining part must be so made and so disposed that the different tolerances developed in manufacture, and from the effect of heat, will not be detrimental for assembly of the lining part and its correct positioning in the passenger compartment.

This problem is solved by the invention in that the padding of the lining part is formed by a foamed layer that is caused to react between the support and the covering element, presenting a cross section development that is adapted to various functions. It is advantageous for this, if for retention of the lining part there be provision of tolerance-compensating studs, applied to the support independently of the foamed layer. The studs cooperate with openings in the support, which are in depressions removed from the foamed layer. Each depression is shielded with reference to the foamed layer by an element that does not change its configuration. On the lining part there are enlargements which are provided as protection of the occupants against impact, or constrictions to receive sun visors, lights or the like. The lining part may also have enlargments that serve as arm rests. In addition, according to one embodiment, inside the enlargement there is provision of a reinforcement, connected with the support.

The particular advantages that the invention offers reside in that with the foamed layer which is caused to react between the support and the covering element, there is the possibility of making the foamed layer and hence also the lining part with different cross sections. Such cross section developments, e.g. depressions, enlargements or the like, allow the acceptance of sun visors, mirrors, etc., or provision of protection for the occupants against impact. Moreover, the arrangement and shape of the studs ensures that even unfavorable tolerances can be compensated. The element which shields the depression makes it possible to keep the foamed material away from the stud during the foaming of the padding. Moreover, there is avoidance of collapsed places on the visible surfaces of the lining part.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
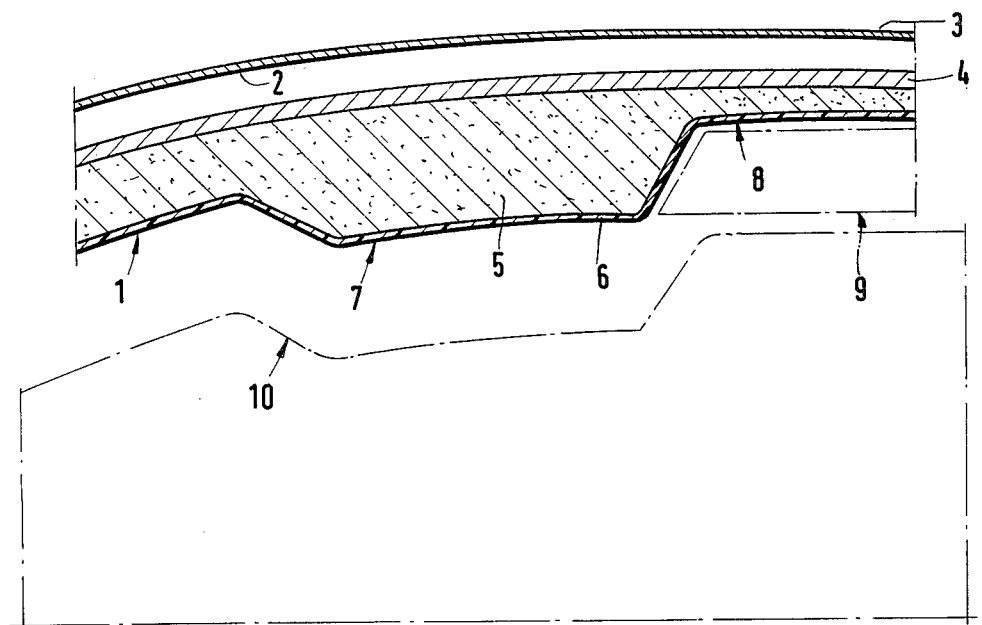
FIG. 1 is a cross-section through a lining part according to the invention.

Lining part 1 according to the invention serves to cover the interior 2 of an automobile roof 3. It comprises a support 4 which is sufficiently rigid that it does not change its configuration, a padding 5, and a covering element 6. The rigid support is made of plastic, cardboard or the like, and it supports foamed padding 5 and covering element 6 which is visible to the passengers, and which is constituted by a plastic foil or imitation leather.

The foamed layer that constitutes padding 5 has a cross section development that is adapted to various functions. Thus, enlargement 7 serves as protection of the occupant against impact, and depression 8 is for countersunk acceptance of a sun visor 9 which is indicated by dot-and-dash lines.

Figure 3:
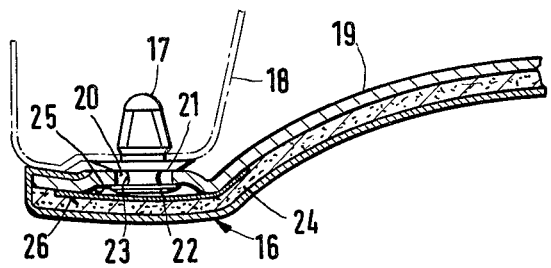
FIG. 3 is a section through the retaining device of the lining part according to the invention.

To produce lining part 1, covering element 6 is placed in a mold 10 and held by vacuum. Thereafter, support 4 is set up at a suitable distance from mold 10 and the medium which forms the foamed layer is introduced into the cavity between the support and the covering element 6. The reacting medium forms the foamed layer and joins the support 4 and covering element 6. The ends of the covering element can be located outside of the mold so that it is not covered by the foamed layer and thereafter can be folded around to the back of the support 4 (as shown in FIG. 3) where it can be attached by gluing, welding, or the like. The method by which such a lining part can be formed is described in greater detail in my co-pending application entitled "Production of a Lining Part for the Interior of an Automobile", filed on July 10, 1978 Ser. No. 923,233, which application is incorporated herein by reference to the extent necessary to complete an understanding hereof.

Figure 2:
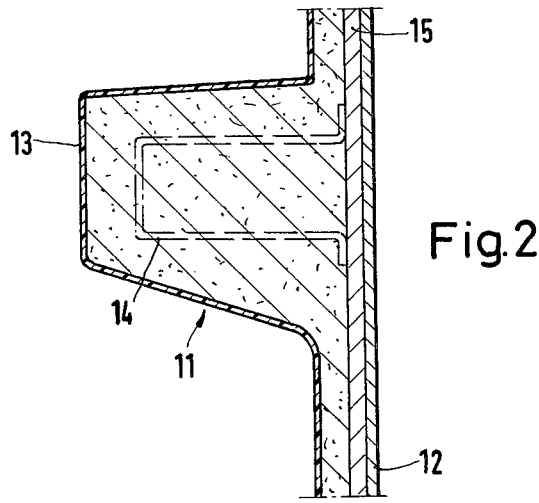
FIG. 2 is a view corresponding to FIG. 1, of another embodiment.

In FIG. 2, a lining part 11 is shown which is disposed on a sidewall 12 of a passenger compartment (which is not indicated in detail) and presents an enlargement 13. This enlargement 13 forms an arm rest for the automobile occupant. For added strength, a reinforcement 14, e.g. metallic sheet, is shown in corporated within enlargement 13, said metallic sheet being foamed around and joined with support 15.

According to the embodiment illustrated in FIG. 3, lining part 16 for a roof is held by studs 17 on roof frame 18. Each stud 17 is held on support 19. For this, support 19 has an opening 20 and each stud has a bearing surface 22 that is larger than the opening 20 for retaining the stud therein. The surface 22 diverges away from the lower end of the stud such that it will flex sufficiently to allow its insertion through opening 20, while being securely restrained from pulling out thereafter. The diameter of opening 20 is larger than that of a neck 23 of stud 17, defined by bearing surfaces 21, 22 so that manufacturing tolerances of the lining part can be compensated for without any problems. In order that the padding 24 will not be applied to stud 17 (thereby leaving stud 17 free to be shifted laterally within the confines of the opening 20), opening 20 is disposed in a depression 25 in support 19. The depression 25 is bowed away from padding 24, and is shielded with respect to padding 24 by an element 26 which is sufficiently rigid that it does not change its configuration, particularly during the reaction joining the foam layer to the support and covering. Thus, when the foamed material is caused to react, it will be prevented from penetration to stud 17, or from bonding itself in opening 20 so that the stud 17 will remain free to move in the opening 20 so as to properly align with the openings in frame 18 despite variations in size due to manufacturing tolerances.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A lining part for a passenger compartment of an automobile comprising a rigid support layer, a foam padding layer, a thin flexible covering element covering the padding, and tolerance-compensating studs for securing the lining part to a vehicle body member, said studs being displaceable disposed on the support independent of the foam layer, wherein said foam padding layer is separated from said support layer in a manner forming hollow areas, said support layer being provided with openings communicating with a respective hollow area, and wherein said studs extend from a first end retained within said hollow areas through said openings to a second end extending from said support layer.

2. A lining part as in claim 1, characterized in that enlargements are provided on the lining part which serves as protection for the occupants against impact.

3. A lining part as in claim 1, characterized in that the lining part is provided with an enlargement forming an arm rest.

4. A lining part as in claim 3, characterized in that a reinforcement is provided within the enlargement which is joined with the support.

5. A lining part as in claims 1 or 2, wherein said lining is provided with constrictions to receive sunvisors, lights, or the like.

6. A lining part according to claim 1, wherein said hollow areas are defined between said support layer and rigid shield elements disposed between the support layer and the foam layer.

7. A lining part according to claims 1 or 6, wherein each of said openings is of a greater diameter than the part of the respective stud extending therethrough so as to enable lateral displacement of the studs within the openings, and wherein retention means are provided for preventing axial removal of the clips from the openings.

8. A lining part according to claim 1, wherein said tolerance-compensating studs are clips.

* * * * *